United States Patent Office 3,534,067
Patented Oct. 13, 1970

3,534,067
TETRAHYDROFURAN 1,2,3,4-TETRACARBOXYLIC ACID AND METHOD OF MAKING SAME
Heinz Rempfer and Karl Peterlein, Gladbeck, Germany, assignors to Gelsenberg Benzin Aktiengesellschaft, a corporation of Germany
No Drawing. Filed June 27, 1968, Ser. No. 740,451
Claims priority, application Germany, July 7, 1967, G 50,576
Int. Cl. C07d 5/04
U.S. Cl. 260—347.3    6 Claims

ABSTRACT OF THE DISCLOSURE

Tetrahydrofurantetracarboxylic acid is produced by contacting endoxotetrahydrophthalic acid or its anhydride with nitric acid. The product is useful in the production of polyimides, polyesters, polyamides, and as curing agent for epoxy resins.

---

The present method is concerned with the production of tetrahydrofuran tetracarboxylic acid (THFTCA). In principle, THFTCA which has not been described in the literature can be prepared by hydrogenation of the known furan tetracarboxylic acid (FTCA). The economy of such a process is, however, doubtful, since, on the one hand, FTCA itself must be prepared in a costly multi-stage process and, on the other hand, the hydrogenation of this acid would result in further expenses.

There has now been found an economic method of producing THFTCA which is characterized by the fact that endoxotetrahydrophthalic acid (endoxo THPA) or its anhydride is oxidized with aqueous nitric acid. The known endoxo THPA can be easily obtained in good yield by Diels-Alder synthesis from furan and maleic acid or its anhydride (British Pat. 692,626; see Ullmann, Encyclopadie d. techn. Chem. vol. 5, page 843).

The finding of the invention is new and was entirely surprising, since it appears from the literature that the hydrogen bridge in ring ethers is split in acid medium, whereby cyclic compounds with 2 trans-substituents are formed (Houben-Weyl, vol. 6/4, page 670). As acids which effect such a splitting there have been mentioned $H_2SO_4$, HCl, acetic acid, etc. In the case of endoxotetrahydrophthalic anhydride, the corresponding phthalic acid derivatives are produced with acids (JACS 55, 431 (1933); Ber. 62, 554 (1929)).

One would therefore have had to expect that nitric acid would also cause such a splitting of the ring and it was accordingly not to be foreseen that aqueous $HNO_3$ selectively splits the ring double bond of the endoxo THP oxidatively with the formation of a tetracarboxylic acid.

Furthermore, it was surprising that at the elevated temperature under which the oxidation is carried out a satisfactory yield of THFTCA is obtained, despite the resplitting of the Diels-Alder adduct which is to be expected. It is advantageous to carry out the reaction in dilute $HNO_3$, in which connection it is not necessary to operate under pressure. The $HNO_3$ concentration can vary within wide limits. A 20–50 percent $HNO_3$ is perferably used. The reaction temperature can be the reflux temperature at normal or elevated pressure. The temperature can be between 20° and 200° C. and preferably between 70–120° C. Oxidation can be effected also first at a lower temperature, for instance 50° C., and then at higher temperature.

Due to the exothermal reaction, it may also be advisable to add the adduct in several portions successively to the nitric acid.

The acid produced in accordance with the invention or its dianhydride are valuable preliminary or intermediate products, inter alia, for the manufacture of plastics, such as polyimides, polyesters, polyamides, plasticizers and curing agents for epoxy resins.

EXAMPLE 1

480 g. endoxotetrahydrophthalic anhydride [3,5-dioxo-4,10-dioxa-tricyclo-[5.2.1.0$^{2.6}$]-decene-(8)] were heated with 6 kg. of 28-percent $HNO_3$ for 20 hours under reflux. Upon concentration substantially to dryness, there are obtained 335 g. (54 mol percent) THFTCA which upon recrystallization from water, has an M.P. of 208° C. (decomp.) and a neutralization number of 891.

EXAMPLE 2

20 g. endoxotetrahydrophthalic anhydride are heated under reflux with 170 g. of 43.5-percent $HNO_3$ for 7 hours. There are obtained 16.7 g. (56 mol percent) of crude THFTCA which, upon recrystallization from water, had an M.P. of 208° (decomp.).

EXAMPLE 3

The same procedure was used as in Example 2, but with heating under reflux for only 2 hours. 13 g. of reaction product having a content of THFTCA determined by gas fractometry of 99.8% was obtained, corresponding to a yield of 44 mol percent.

50 g. of the crude THFTCA were heated with 80 g. of butanol, 100 ml. of benzene and 2 g. of concentrated $H_2SO_4$ for 6 hours with agitation, the water of reaction being completely removed by means of a water trap. After washing the reaction solution, the benzene was expelled and the residue distilled in vacuum. There are obtained 75 g. of THFTCA tetrabutyl ester (79 mol percent) of B.P.$_{0.05}$=205° C.

EXAMPLE 5

20 g. of endoxotetrahydrophthalic anhydride were heated with agitation at only 50° with 170 g. of 43.5-percent $HNO_3$ for 7 hours. After concentration, the slimy residue was again treated with the same quantity of 43.5-percent $HNO_3$ and heated again for 7 hours under reflux. After working up, there are obtained 11.3 g.—37.7 mol percent THFTCA of M.P. 206° C. (decomp.).

What is claimed is:
1. Tetrahydrofuran 1,2,3,4-tetracarboxylic acid:

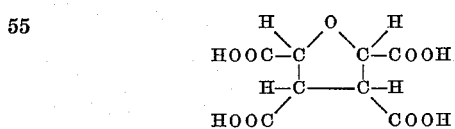

2. Process of producing tetrahydrofuran 1,2,3,4-tetracarboxylic acid which comprises contacting endoxotetrahydrophthalic acid or its anhydride with nitric acid at a temperature and for a time sufficient for formation of said tetrahydrofuran 1,2,3,4-tetracarboxylic acid.

3. Process according to claim 2, said contacting being in an aqueous medium.

4. Process according to claim 1, said nitric acid being aqueous nitric acid of about 5–70% by weight concentration.

5. Process according to claim 4, said concentration being about 20–50% by weight.

6. Process according to claim 5, the temperature being the reflux temperature.

References Cited

Chemical Abstracts—Cantlon et al., vol. 56 (1962) p. 11530.

ALEX MAZEL, Primary Examiner
B. I. DENTZ, Assistant Examiner

U.S. Cl. X.R.
260—2, 30.4, 78

PO-1050
(5/69)

UNITED STATES PATENT OFFICE
CERTIFICATE OF CORRECTION

Patent No. 3,534,067          Dated Oct. 13, 1970

Inventor(s) Heinz Dempfer and Karl Peterlein

It is certified that error appears in the above-identified patent and that said Letters Patent are hereby corrected as shown below:

Col. 2, line 41, "Example 5" should read
--Example 4--.

SIGNED AND
SEALED
JAN 19 1971

(SEAL)
Attest:

Edward M. Fletcher, Jr.
Attesting Officer

WILLIAM E. SCHUYLER, JR.
Commissioner of Patents